United States Patent [19]
Cooper et al.

[11] Patent Number: 4,594,511
[45] Date of Patent: Jun. 10, 1986

[54] METHOD AND APPARATUS FOR DOUBLE MODULATION SPECTROSCOPY

[75] Inventors: David E. Cooper, Palo Alto, Calif.; Thomas F. Gallagher, Charlottesville, Va.

[73] Assignee: SRI International, Menlo Park, Calif.

[21] Appl. No.: 717,356

[22] Filed: Mar. 29, 1985

[51] Int. Cl.[4] ..................... G01N 21/27; G01N 21/00
[52] U.S. Cl. ................................. 250/339; 250/338; 250/341; 250/351; 250/372; 356/318
[58] Field of Search ........... 250/351, 341, 339, 338 R, 250/372; 378/53; 356/300, 318, 349

[56] References Cited
U.S. PATENT DOCUMENTS

| | | | |
|---|---|---|---|
| 4,051,371 | 9/1977 | Dewey, Jr. et al. | 250/339 |
| 4,094,608 | 6/1978 | Young | 356/97 |
| 4,176,959 | 12/1979 | Keene et al. | 356/325 |
| 4,184,768 | 1/1980 | Murphy et al. | 356/326 |
| 4,187,026 | 2/1980 | Schaffer et al. | 356/326 |
| 4,241,997 | 12/1980 | Chraplyvy | 356/309 |
| 4,284,354 | 8/1981 | Liao | 356/301 |
| 4,297,035 | 10/1981 | Bjorklund | 356/402 |
| 4,383,181 | 5/1983 | Roess et al. | 250/573 |
| 4,426,640 | 1/1984 | Becconsall et al. | 340/632 |
| 4,441,815 | 4/1984 | Izumi | 356/328 |
| 4,448,494 | 5/1984 | Freyre | 350/358 |
| 4,448,529 | 5/1984 | Krause | 356/310 |
| 4,450,356 | 5/1984 | Murray et al. | 250/339 |
| 4,455,097 | 6/1984 | Ichikawa et al. | 356/323 |
| 4,462,687 | 7/1984 | Krause | 356/326 |
| 4,469,443 | 9/1984 | Geller | 356/364 |
| 4,498,770 | 2/1985 | Corwin et al. | 356/349 |
| 4,523,847 | 6/1985 | Bjorklund et al. | 356/349 |

OTHER PUBLICATIONS

B. S. Vorob'ev, "Increasing the Signal-to-Noise Ratio in a Spectrophotometer Employing Double Modulation of the Light Flux", Soviet Journal of Optical Technology, vol. 48, No. 2, (Feb. 1981), pp. 125-126.
G. C. Bjorklund, "Frequency-Modulation Spectroscopy: A New Method for Measuring Weak Absorptions and Dispersions", Optics Letters, vol. 5, No. 1, (Jan. 1980), pp. 15-17.

Primary Examiner—Bruce C. Anderson
Assistant Examiner—Constantine Hannaher
Attorney, Agent, or Firm—Townsend & Townsend

[57] ABSTRACT

A spectroscopic technique in which the sample under investigation is probed with a generally monochromatic beam of light which has been modulated at two distinct modulation frequencies. The double modulation produces a plurality of sidebands, and the two modulation frequencies are related to one another such that a selection of sidebands falls into two groups of closely spaced component sidebands. A first group is disposed in frequency at the spectral feature of interest and serves to probe the spectral feature. The other group is disposed in frequency remote from the feature and serves as a reference group. Within each group the component sidebands are offset from one another by a characteristic offset frequency, which can be considerably less than the width of the spectral feature under investigation. After interaction with the sample the doubly modulated beam is passed on to a photodetector, which in combination with appropriate signal processing apparatus detects a signal at the characteristic offset frequency representative of the spectral feature.

63 Claims, 4 Drawing Figures

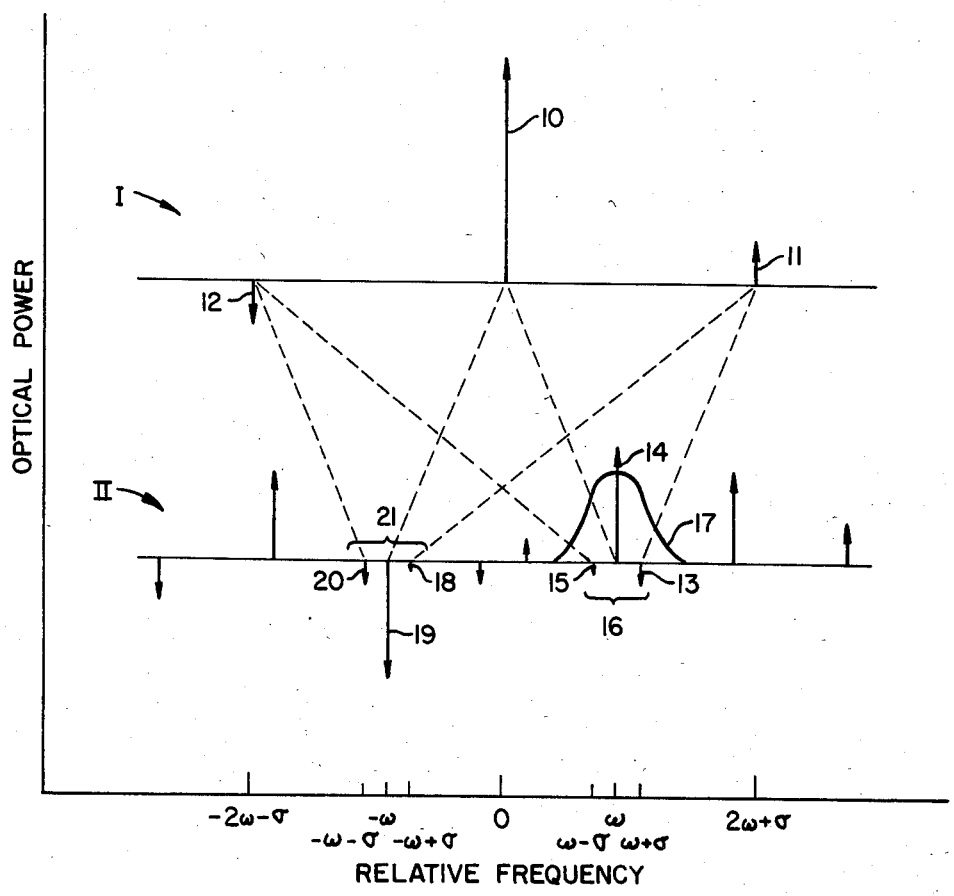
FIG.__1.
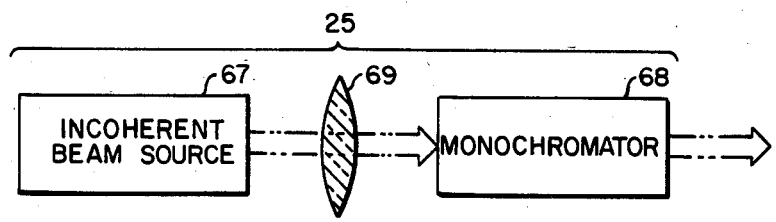
FIG.__4.

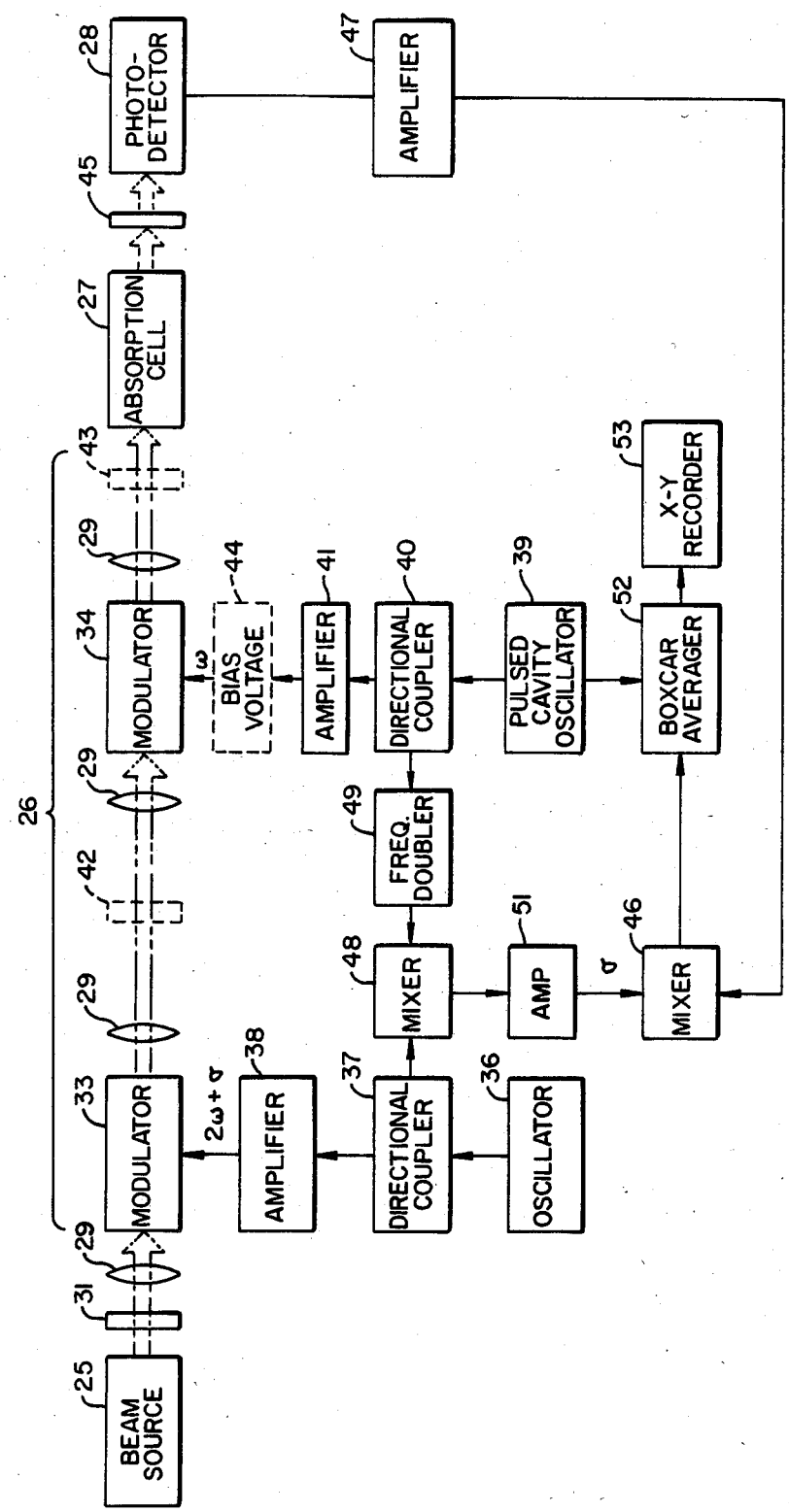
FIG._2.

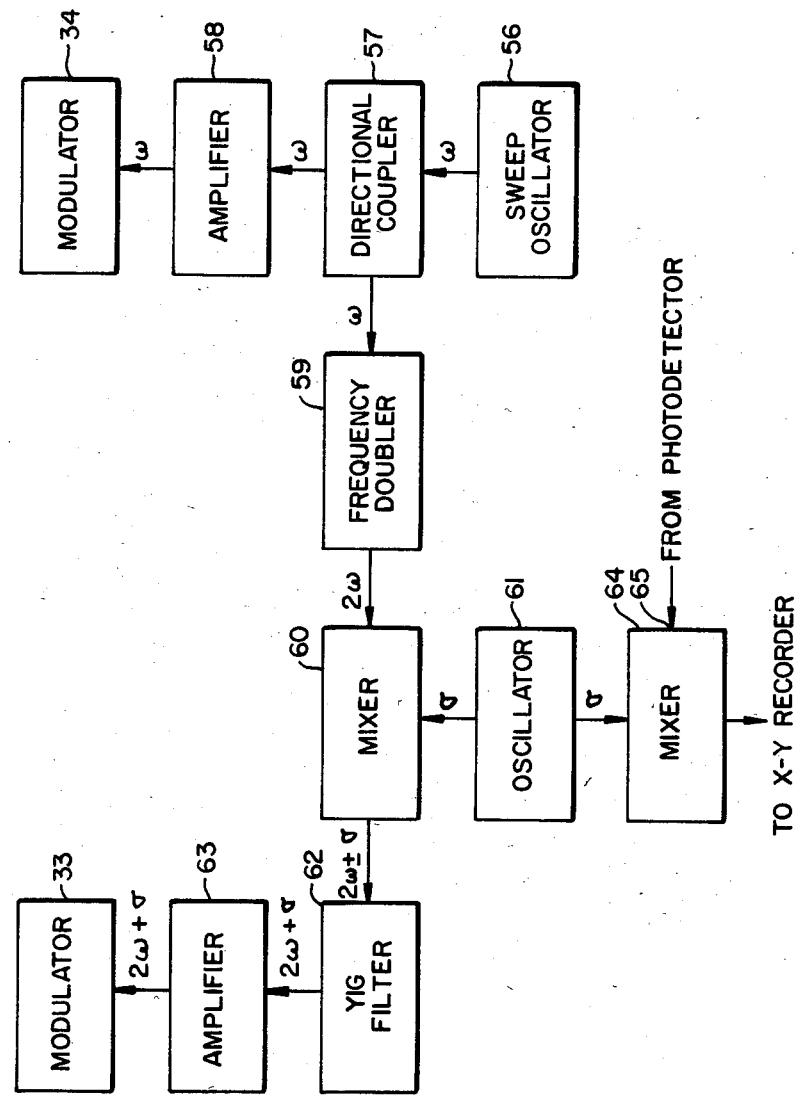
FIG._3.

METHOD AND APPARATUS FOR DOUBLE MODULATION SPECTROSCOPY

BACKGROUND OF THE INVENTION

The invention relates to the field of optical heterodyne spectroscopy and more particularly to spectroscopic techniques using frequency-modulated light beams for probing the spectral properties of a sample.

Generally speaking, in optical spectroscopy a probe light beam of known frequency characteristics is directed at the sample under investigation, and one or more properties of the radiation from the sample are measured after interaction of the sample with the incident probe beam. From the observed properties information can be extracted concerning the spectral feature of interest. As advances are made in spectroscopic technique, an ever-increasing variety of quantities are observed which carry information about the spectral feature under examination. For example, in many spectroscopic arrangements the overall absorption and/or dispersion experienced by the probe beam is measured as the frequency of the probe beam is varied over a range including the spectral feature of interest. In other techniques more refined parameters such as higher-order susceptibilities are measured, and these may be determined through experimental arrangements for observing either steady-state properties of the sample or its transient response to a sudden change. In optical heterodyne spectroscopy the observable quantity carrying the information of spectroscopic interest is shifted to a frequency domain removed from that of the spectral feature under investigation, where the quantity can then be detected and analyzed more conveniently, more accurately, or more economically.

In an article entitled "Frequency-Modulation Spectroscopy: A New Method for Measuring Peak Absorptions and Dispersions" G. C. Bjorklund discloses an optical heterodyne spectroscopic technique in which a laser beam with an rf frequency modulation is used as a probe beam, and the desired spectroscopic information is contained in a beat signal at the modulation frequency. The Bjorklund method is also the subject of U.S. Pat. No. 4,297,035.

In particular, Bjorklund employs a single-mode laser beam having a frequency $\omega_c$ in the visible spectrum, which is modulated with a frequency $\omega_m$, typically on the order of 500 megahertz, so as to produce a beam having first-order sidebands at frequencies $\omega_c \pm \omega_m$. In a typical spectroscopic experiment the modulated beam probes a sample having an absorption line in the vicinity of one of the sidebands, e.g., in the vicinity of the upper first-order sideband. Differential absorption of the two sidebands at frequencies $\omega_c \pm \omega_m$ provides a measure of the absorption feature at frequency $\omega_c + \omega_m$ with respect to the baseline established by the lower sideband at frequency $\omega_c - \omega_m$, which lies outside the frequency range of the absorption feature. When the modulated beam emerging from the sample is passed through a photodetector, a signal is produced at the beat frequency $\omega_m$ representative of the differential absorption, hence, of the spectral feature.

The success of the Bjorklund method depends upon the availability of a photodetector responsive to the frequency and power level of the beat signal at frequency $\omega_m$. A lower limit is placed on the bandwidth of the photodetector by the modulation frequency $\omega_m$, which at the minimum must be greater than the linewidth of the laser beam and greater than the width of the spectral feature of interest and, to derive full benefit from the Bjorklund technique, should be much greater than the width of the spectral feature.

Typical Doppler-broadened gases have linewidths on the order of 50 megahertz in the infrared portion of the spectrum and 2 gigahertz in the visible portion, whereas atmospheric pressure-broadened gases have even larger linewidths, on the order of 3 gigahertz in the infrared and 10 to 20 gigahertz in the visible. Thus, in making measurements on gaseous samples the modulation frequency $\omega_m$, and consequently the minimum bandwidth of a suitable detector, must exceed at least 50 megahertz for analysis of Doppler-broadened lines in the infrared domain, and must exceed up to 20 gigahertz for measurements on atmospheric gases in the visible domain.

As is well known, increased photodetector bandwidth can be achieved only at the expense of sensitivity. It would be desirable, for example, to extend the Bjorklund technique to the 8 to 12-micron atmospheric wavelength window for observing numerous molecular species in the atmosphere known to have strong absorption features. However, suitably sensitive photodetectors having adequate bandwidth to handle the atmospheric pressure-broadened spectral features are not available in this frequency domain. Thus, the stringent requirements on bandwidth present a severe impediment to the extension of FM spectroscopy to this and other spectral regions of interest, as well as to applications in which optical power levels are constrained to be low.

SUMMARY OF THE INVENTION

The present invention provides a method and apparatus for FM spectroscopy which overcomes the above-mentioned limitations of the Bjorklund technique. In particular, the invention enables one to use a photodetector having a bandwidth much less than the spectral width of the feature of interest and a small fraction of the modulation frequency of the Bjorklund method.

According to the invention the sample under investigation is probed with a generally monochromatic beam of light which has a linewidth less than or comparable with the spectral feature of interest and which is modulated at two distinct modulation frequencies. The double modulation produces a plurality of sidebands, and the two modulation frequencies are related to one another such that a selection of sidebands falls into two groups of closely spaced component sidebands. A first group of sidebands is disposed in frequency approximately at the spectral feature of interest and serves as a probe group for probing the spectral feature. The other group is disposed in frequency remote from the feature and serves as a reference group. Within each group the component sidebands are offset from one another by a characteristic offset frequency, which can be considerably less than the width of the spectral feature under investigation. After interaction with the sample the doubly modulated beam is passed on to a photodetector, which in combination with appropriate signal processing apparatus detects a signal at the characteristic offset frequency representative of the spectral feature.

As a specific embodiment of the invention the incident light beam can be modulated at the two frequencies $\omega$ and $2\omega + \sigma$, where $\omega$ is approximately equal to the displacement in frequency of the spectral feature from the linecenter of the beam and o is the offset frequency, generally a small fraction of the width of the spectral feature. With these two modulation frequencies, and appropriate choice of modulation indices, the probe and reference groups will each contain two or three component sidebands offset from one another by the frequency $\sigma$. The photodetector, being responsive to the intensity of the received radiation field, mixes the component sidebands and produces a beat signal at the frequency $\sigma$ which provides a comparison of the effects of the sample medium on the probe and reference sideband groups. The invention overcomes the limitations on the photodetector imposed by other optical heterodyne techniques in that the photodetector used with the present invention need only accommodate the offset frequency $\sigma$, which is generally much smaller than either modulation frequency and may even be much smaller than the spectral feature to be observed.

The double modulation may be carried out according to the invention in a variety of ways. For example, both modulations may be frequency modulations or one may be a frequency modulation while the other is an amplitude modulation. The term "frequency modulation" is used herein in a broad sense to encompass all forms of phase angle modulation. By employing various types of modulation schemes the invention finds application under a variety of extreme conditions on available light levels and modulation power levels. For example, the FM-AM embodiment is advantageous when optical power levels are high, but available power to drive an amplitude modulator is low such as in the use of a $CO_2$ laser in the 9 to 11-micron wavelength region, in which high modulation power levels cannot readily be attained with currently available crystal modulators. In a complementary manner the FM-FM embodiment is advantageous when optical power levels are low, but at least one modulation can be provided by a modulator driven at a comparatively high power level.

The requisite double modulation according to the invention can be provided in one embodiment by a pair of oscillators for generating the two modulation frequencies. The oscillators are each coupled to electro-optic modulators through directional couplers. Modulation signals from the directional couplers are mixed in appropriate harmonic ratio so as to generate a reference signal at the offset frequency. In this embodiment the doubly modulated beam is directed at the sample and a photodetector is positioned to receive the beam after it passes through the sample. The photodetector output signal is mixed with the reference signal so as to extract the component of the photodetector output signal at the offset frequency. According to the invention the spectroscopic information of interest is carried by this component.

The invention may be embodied in apparatus for merely detecting the existence of a particular spectral feature as might be useful, for example, in a field device for monitoring the presence of certain known atmospheric pollutants. Alternatively, the invention may be embodied in apparatus for determining the detailed lineshape of the feature. In such an embodiment it is desirable that both the linewidth of the monochromatic beam and the offset frequency be significantly less than the width of the spectral feature and that the probe sideband group be sweepable through the feature. Sweeping the probe sideband group is accomplished either by sweeping the center frequency of the monochromatic beam, as for example by tuning a semiconductor diode laser beam source, or by holding the beam linecenter fixed and sweeping the modulation frequencies.

An embodiment of apparatus for sweeping the modulation frequencies includes a sweep oscillator for generating a first modulation frequency and a separate oscillator for generating a fixed offset frequency. The sweep oscillator is coupled to one electro-optic modulator through a directional coupler, and optionally through frequency synthesis means, for driving the modulator at the first modulation frequency, which is equal to the sweep oscillator frequency or to a frequency derived from the sweep oscillator frequency by the frequency synthesis means. The sweep oscillator frequency from the directional coupler is applied to a second frequency synthesis means and is then mixed with the fixed offset frequency to derive the second modulation frequency, which is coupled to a second electro-optic modulator. Sweeping the first oscillator frequency causes all the component sidebands of the probe and reference groups to sweep synchronously with one another while maintaining a fixed frequency offset.

In another aspect of the invention the double modulation technique can be used to provide a highly sensitive, accurate, and commercially viable visible-wavelength single-beam absorption spectrometer having an incoherent light source. The double modulation technique allows a high-gain, low-bandwidth photodetector to be used. This sufficiently enhances the usable gain available from the photodetector and sufficiently enhances the signal-to-noise characteristics of the system that a comparatively low-power incoherent light source such as a xenon lamp may be used to provide an accuracy and sensitivity previously achievable only with higher-power laser sources.

Other aspects, advantages and features of the invention are described hereinbelow or will be readily apparent to those skilled in the art from the following specifications and drawings.

BRIEF DESCRIPTION OF THE DRAWINGS

FIG. 1 is a diagram illustrating the optical power spectrum of singly and doubly modulated light beams. Graph I illustrates the power spectrum of FM light with a single modulation frequency $2\omega + \sigma$ and modulation index $M_1$ approximately equal to unity. Graph II shows the resulting power spectrum after modulating the singly modulated beam of Graph I with a second modulation frequency $\omega$ and modulation index $M_2$ approximately equal to the first zero of the zeroth-order Bessel function.

FIG. 2 is a block diagram illustrating apparatus for performing the double modulation spectroscopy technique according to the invention.

FIG. 3 is a block diagram showing an alternative embodiment adapted for sweeping the probe sideband group through the spectral feature under investigation by sweeping the modulation frequency.

FIG. 4 is a block diagram of an alternative beam source for use in an incoherent spectrometer according to the invention.

DETAILED DESCRIPTION OF ILLUSTRATIVE EMBODIMENTS

Theoretical Background

For a full appreciation of the scope and many embodiments of the present invention, it is beneficial to discuss the theoretical underpinnings prior to describing apparatus for practicing the invention. For the sake of illustration the discussion is given for the FM-FM case, in which the beam undergoes two frequency modulations. Similar theoretical considerations apply to the FM-AM case with similar results.

Equation 1 describes the electric field $E_{FM-FM}(t)$ of a generally monochromatic beam of light which has been subjected to double frequency modulation at modulation frequencies $\Omega_1$ and $\Omega_2$:

$$E_{FM-FM}(t) = (E_0/2) \sum_{p,q=0}^{\infty} J_p(M_1) J_q(M_2) \times \quad (1)$$

$$\exp i(\omega_c + p\Omega_1 + q\Omega_2)t + \text{complex conjugate}.$$

In Eq. (1) $\omega_c$ is the linecenter frequency of the generally monochromatic beam. The parameters $M_1$ and $M_2$ are the modulation indices of the first and second modulations, respectively, and the factors $J_n$ are the Bessel functions of integer order. The effect of the optical medium provided by the sample under investigation is represented by complex frequency-dependent transmission factors $T_{pq}$, which are functions of the sum $\omega_c + p\Omega_1 + q\Omega_2$. In terms of these transmission factors the electric field $E_T(t)$ after interaction with the sample is given by Eq. (2):

$$E_T(t) = (E_0/2) \sum_{p,q=0}^{\infty} J_p(M_1) J_q(M_2) T_{pq}(\omega_c + p\Omega_1 + q\Omega_2) \times \quad (2)$$

$$\exp i(\omega_c + p\Omega_1 + q\Omega_2)t + \text{complex conjugate}.$$

The power spectrum of the beam, as measured for example by a square-law photodetector sensitive to the beam intensity $|E_T|^2$, is given by Eq. (3):

$$P(t) = (cE_0^2/8\pi) \sum_{p,q} \sum_{r,s} J_p(M_1) J_q(M_2) J_r(M_1) J_s(M_2) \times \quad (3)$$

$$T_{pq} T_{rs}^* \exp i[(p-r)\Omega_1 + (q-s)\Omega_2]t.$$

As an illustrative example the modulation frequencies $\Omega_1$ and $\Omega_2$ are set equal to $2\omega + \sigma$ and $\omega$, respectively. The second modulation frequency $\omega$ is chosen to equal the approximate frequency displacement of the spectral feature of interest from the beam linecenter $\omega_c$. The frequency $\sigma$ will generally be chosen to be less than the width of the spectral feature of interest and less than the bandwidth of the photodetector. The contribution to the power spectrum from components at frequency $\sigma$ is given by Eq. (4):

$$P_\sigma(t) = (cE_0^2/8\pi) \sum_{p,q} J_p(M_1) J_q(M_2) [J_{p-1}(M_1) J_{q+2}(M_2) \times \quad (4)$$

$$T_{pq} T_{p-1,q+2}^* e^{i\sigma t} + J_{p+1}(M_1) J_{q-2}(M_2) T_{pq} T_{p+1,q-2}^* e^{-i\sigma t}].$$

Assume for the sake of illustration that the modulation index of the first modulation is less than or approximately equal to unity, $M_1 < 1$, so that only the carrier and first-order sidebands resulting from the first modulation will contain significant power and only terms having a first index p equal to 0 and $\pm 1$ will give a significant contribution to Eq. (4).

FIG. 1 compares the power spectra of singly modulated and doubly modulated beams. Graph I shows the FM power spectrum of such a singly modulated beam and is drawn assuming $M_1$ approximately equal to 1 so that only the center line and first-order sidebands are significant. The line 10 represents the center frequency of the generally monochromatic beam. It gives rise to the terms with first index p=0 of Eq. (4). The lines 11 and 12 represent the first-order sidebands of the singly modulated beam at frequency $2\omega + \sigma$ and give rise to the terms with first index p=±1 of Eq. (4). Graph II shows the FM power spectrum of a doubly modulated beam. The sidebands 13, 14 and 15 result from modulation of the carrier 10 and first-order sidebands 11 and 12 by appropriate harmonics of the second modulation frequency $\omega$. For convenience in Graph II the second modulation index $M_2$ is taken approximately equal to 2.4, which corresponds to the first zero of the Bessel function $J_0$ so that the second modulation causes the carrier and all sidebands from the first modulation to shift in frequency. Sidebands 13, 14 and 15 form a first group of sidebands 16 offset from one another by the frequency $\sigma$. That group is disposed at the spectral feature 17 under investigation so that all component sidebands of the group lie within the width of the feature. Sidebands 18, 19 and 20 form a second group 21 offset from one another by the frequency $\sigma$ and disposed below the center of the line 10 symmetrically with respect to the first group 16, so as to lie remote from the range of the spectral feature of interest. The dashed lines from Graph I to Graph II show how the single modulation spectrum splits to form the double-modulation spectrum when the second modulation is applied.

The contribution to the power spectrum at frequency $\sigma$ from sideband groups 16 and 21 centered at frequencies $\omega$ and $-\omega$ is given by:

$$P_\sigma(t) = (cE_0^2/8\pi) J_0(M_1) J_1(M_1) \{J_1(M_2) J_1(M_2)[(\delta_{\omega+\sigma} + \quad (5)$$
$$2\delta_\omega + \delta_{\omega-\sigma}) - (\delta_{-\omega-\sigma} + 2\delta_{-\omega} + \delta_{-\omega+\sigma})] \cos \sigma t +$$
$$[J_1(M_2) J_1(M_2)[(\phi_\omega + \phi_{-\omega}) - (\phi_{\omega+\sigma} + \phi_{-\omega-\sigma})] +$$
$$J_1(M_2) J_3(M_2)[(\phi_{\omega-\sigma} + \phi_{-\omega+\sigma}) - (\phi_\omega + \phi_{-\delta})]] \sin \sigma t\},$$

where a weak interaction has been assumed between the sample medium and the electromagnetic probe field so that the transmission factors may be written in terms of the absorption and phase shift factors $\delta_{pq}$ and $\Phi_{pq}$:

$$T_{pq} = \exp-(\delta_{pq} + i\Phi_{pq}). \quad (6)$$

To make the notation more transparent, the numerical subscripts have been replaced by their corresponding frequencies.

Assuming as in Graph II of FIG. 1 that the spectral feature is probed by the upper sideband group and that the offset frequency $\sigma$ is small relative to the linewidth of the feature, the three component sidebands of the upper sideband group 16 will all face the same absorption and phase shift factors, which are representative of the absorption and dispersion caused by the spectral feature. The three component sidebands of the lower group 21 will likewise all face the same absorption and phase shift factors which, because the lower sideband group is remote from the spectral feature of interest, can be taken to represent the background. Thus, setting $$\delta_{\omega+\sigma} = \delta_\omega = \delta_{\omega-\sigma} \equiv \delta_+,$$
$$\Phi_{\omega+\sigma} = \Phi_\omega = \Phi_{\omega-\sigma} \equiv \Phi_+,$$
$$\delta_{-\omega-\sigma} = \delta_{-\omega} = \delta_{-\omega+\sigma} \equiv \delta_b,$$
$$\Phi_{-\omega-\sigma} = \Phi_{-\omega} = \Phi_{-\omega+\sigma} \equiv \Phi_b, \quad (7)$$

and expanding the Bessel functions of the argument $M_1 < 1$, Eq. (5) reduces to:

$$P_\sigma(t) = (cE_0^2/8\pi)2M_1J_1^2(M_2)(\delta_+ - \delta_b)\cos \sigma t. \quad (8)$$

Eq. (8) represents the contribution to the power spectrum of the signal received by the photodetector from the upper and lower sideband groups under the simplifying assumptions described above. Eq. (8) contains only an in-phase term at the frequency $\sigma$. The magnitude of the contribution is determined by the magnitudes of the modulation indices $M_1$ and $M_2$.

It is a feature of the invention that the component signal representative of the spectral feature has frequency $\sigma$, which may be arranged to be quite small in comparison with the displacement of the spectral feature from the linecenter of the probing beam. This is in contrast with the FM spectroscopic technique of Bjorklund, in which the signal representative of the spectral feature has frequency $\omega$. Thus, in the present invention the photodetector may have a much smaller bandwidth. Because of the inherent gain-bandwidth limitation of the photodetector, the photodetector in the present invention can be given a commensurately greater gain so that the present spectroscopic technique can be applied using much lower light levels. Furthermore, the present spectroscopic technique can be extended to spectral domains in which sufficiently broadband photodetectors for practicing the Bjorklund method are unavailable or uneconomical.

Structure And Operation

FIG. 2 shows a block diagram of apparatus according to the invention. The apparatus includes a source 25 of a generally monochromatic beam of light, modulation means indicated generally at 26 for modulating the light beam at two distinct modulation frequencies, means such as absorption cell 27 for exposing the sample under investigation to the light beam, and a photodetector 28 for receiving the light beam after it has interacted with the sample in the cell 27. The beam is focused on the modulation means 26 and on absorption cell 27 and photodetector 28 by conventional optical elements represented symbolically in FIG. 2 by lenses 29. Means for focusing and directing the beam are well known to those in the art and will not be described in detail here.

Monochromatic light source 25 may be provided by a laser such as a conventional helium-neon laser providing a beam of light in the visible spectrum. The present invention is not confined to the visible spectrum, however, and in fact finds useful application in extending known FM spectroscopic techniques to the infrared, ultraviolet or even X-ray domains. Thus, source 25 may be taken to be a source of light in any of these spectral domains. As used herein, the term "light" shall be understood to embrace not only electromagnetic radiation in the visible portion of the spectrum, but also radiation extending into the infrared, ultraviolet and X-ray portions of the spectrum.

A laser source 25 may be operated in a single-mode or multi-mode fashion. When a helium-neon laser is used, for example, a single cavity mode may be selected by a single polarizer 31 disposed in the beam path, as depicted in FIG. 2. In certain applications of the invention discussed more fully below, light source 25 may be provided by a tunable laser such as a semiconductor diode laser or even by an incoherent beam source.

As illustrated in FIG. 2, modulation means 26 is provided by first and second electro-optic modulators 33 and 34 of conventional construction disposed in the beam path. Depending on the spectral region of interest, such modulators may be constructed, for example, from lithium tantalate ($LiTaO_3$) or cadmium tellurium (CdTe) crystals. The operation and construction of such electro-optic modulators for the frequency ranges of interest here are known to those skilled in the art and are discussed, for example, in *An Introduction to Electrooptic Devices*, by Ivan P. Kaminow, Editor, Academic Press, New York, London 1974.

Modulator 33 is driven by oscillator 36, which is coupled to modulator 33 through directional coupler 37 and solid-state amplifier 38. In the embodiment of FIG. 2, oscillator 36 generates a modulation frequency of $2\omega + \sigma$, where frequency $\omega$ is equal to the approximate displacement of the spectral feature of interest from the linecenter of laser 25, the same as in the above theoretical discussion. Modulator 34 is driven by oscillator 39, which is coupled to modulator 34 through directional coupler 40 and amplifier 41. As illustrated in FIG. 2, oscillator 39 drives modulator 34 at the modulation frequency $\omega$. The component power $P_\sigma(t)$ at frequency $\sigma$ given approximately by Eq. (8) can be maximized by driving modulator 34 at a power level having a modulation index $M_2$ of about 1.8, which maximizes the Bessel function $J_1$ of order 1.

In the embodiment described thus far (the FM-FM embodiment), modulators 33 and 34 are both frequency modulators. In another embodiment of the invention (the FM-AM embodiment), the second modulation of the beam is an amplitude modulation. The additional means needed to convert the second, frequency modulation to an amplitude modulation are depicted in phantom in FIG. 2. Linear polarizers 42 and 43 are disposed in the beam path before and after modulator 34 and are oriented with their axes of polarization perpendicular to one another. When modulator 34 is provided by a crystal exhibiting a natural birefringence, the apparatus further includes biasing means 44 for applying a DC bias voltage across the crystal to counteract that birefringence.

In the illustrative embodiment of FIG. 2 the doubly modulated beam impinges upon the sample within absorption cell 27 and passes on to photodetector 28. It will be appreciated by those skilled in the art given the benefit of this disclosure that the use of an absorption cell is not essential to the practice of the invention. Other configurations and means familiar from other spectroscopic techniques may equivalently be used for exposing the sample to the beam. For example, configurations may be employed in which either the transmitted or reflected portions of the beam are analyzed by the photodetector after interaction with the sample.

Photodetector 28 may be provided by a conventional square-law photodetector sensitive to the intensity of the light beam, that is, sensitive to the square of the electric radiation field given by Eq. (2). Such square-law detectors may be provided by conventional photomultiplier tubes or semiconductor photodiodes. For protection when a photomultiplier tube is used and the apparatus is operated at high light levels, FIG. 2 includes a neutral-density filter 45 placed in the beam path before the photomultiplier.

Photodetector 28 provides an output signal which is representative of the beam impinging upon the photodetector from the sample. The signal of interest, which represents the spectral feature under investigation, is the Fourier component of the photodetector output signal at frequency $\sigma$. To derive this signal, the photodetector output signal is applied to mixer 46 through amplifier 47, where it is compared with a local oscillator reference signal at the frequency $\sigma$.

The local oscillator reference signal is provided by mixer 48. A signal at the modulation frequency $2\omega+\sigma$ from oscillator 36 is applied to mixer 48 through directional coupler 37. A signal at twice the modulation frequency $\omega$ is applied to mixer 48 from oscillator 39, which is coupled to mixer 48 through directional coupler 40 and frequency doubler 49. Mixer 48 generates the local oscillator reference signal by mixing the signal from oscillator 36 with the frequency-doubled signal from oscillator 39. The difference is the reference signal at frequency $\sigma$, which is applied to mixer 46 through amplifier 51. Mixer 46 derives the Fourier component at frequency $\sigma$ from the photodetector output signal. That Fourier component is then applied to signal averaging or other signal processing means 52. The output from signal averaging means 52 may be applied directly to suitable recording means such as XY recorder 53 or alternatively the signal may be applied directly to other recording or signal-analyzing apparatus.

The present invention may be practiced in both a continuous-wave and pulsed mode of operation. As a general rule, a higher signal-to-noise ratio can be achieved in the continuous-wave mode. However, a pulsed operation is sometimes desirable, for example, when photodetector 28 is provided by a photomultiplier tube, which cannot be continuously subjected to high light levels for prolonged periods. Pulsed operation is also indicated when higher power levels are needed to drive the modulators. For example, a lithium tantalate crystal modulator can be extended to the infrared region, where it is less efficient, by driving it at the higher power levels available through pulsed operation.

In the FM-AM configuration of FIG. 2, pulsed operation is achieved by driving modulator 34 with a pulsed cavity oscillator 39. Even if a continuous wave source 25 is used, the light will be extinguished by crossed polarizers 42 and 43 between pulses. Biasing means 44 assures that the transmitted beam is extinguished between pulses when crystal modulator 34 exhibits a natural birefringence. Pulsed cavity oscillator 39 is also used to trigger signal averaging means 52. In the FM-FM configuration pulsed operation can be achieved by pulsing the laser source 25. For apparatus capable of operation in both the FM-FM and FM-AM configurations, oscillator 39 may be provided by a pulsed cavity oscillator, which is pulsed synchronously with the beam source 25 and with the signal averaging means 52.

It will be apparent to those skilled in the art that the present invention can be practiced with a number of configurations and with numerous commercially available components. In an experimental configuration actually constructed for testing the invention, beam source 25 was provided by a Spectra-Physics Model 102 helium-neon laser available from Spectra-Physics Corporation of Mountain View, Calif. The laser provides a line with characteristic linecenter at 632.8 nanometers and characteristic linewidth on the order of 5 megahertz. The operating power is 2 milliwatts and the cavity mode spacing is 641 megahertz. A linear polarizer 31 was used to select a single cavity mode with about 1 milliwatt of power. Modulators 33 and 34 were constructed of lithium tantalate crystals. Oscillator 36 was provided by a Hewlett-Packard 8620 sweep oscillator available from Hewlett-Packard Corporation of Palo Alto, Calif. The sweep oscillator was driven in a continuous-wave mode at frequency $2\omega+\sigma$ equal to 1460 megahertz. Amplifier 38 was provided by a conventional solid-state power amplifier capable of a 10-watt output. The drive power from amplifier 38 was adjusted to put approximately 15% of the optical power in each of the two first-order sidebands, which corresponds to a modulation index $M_1$ approximately equal to 0.8. In the FM-AM configuration oscillator 39 was provided by an EPSCO PG5kB pulsed cavity oscillator having a 250-hertz repetition rate and a 50-microsecond pulse width. The power level from oscillator 39 was adjusted to give a modulation index $M_2$ approximately equal to unity. A DC bias voltage of up to 200 volts was applied across the lithium tantalate crystal comprising modulator 34. Absorption by a sample was simulated with a scannable Spectra-Physics Model 410 etalon. The beam from the etalon was directed through appropriate neutral-density filters onto an RCA 931 photomultiplier tube with 600 to 900 volts applied across the dynode chain. The photomultiplier bandwidth was less than 100 megahertz, and the average incident optical power was approximately 65 nanowatts. Amplifier 47 was provided by a Hewlett-Packard Model 461A amplifier, which amplified the detector photocurrent 20 dB. Mixers 46 and 48 were provided by Mini Circuits Models ZFM-3 and ZFM-150 mixers, respectively. The frequency doubler 49 was provided by a Mini Circuits Model FK-5 frequency doubler. Amplifier 51 was provided by a Hewlett-Packard Model 462A amplifier, which amplified the output signal from mixer 48 to a 5-milliwatt peak. Signal-averaging means 52 was provided by a PAR 162 boxcar signal averager, which was triggered by pulses from cavity oscillator 39.

In the FM-FM test configuration, the polarizers 42 and 43 were removed and no DC bias voltage was applied across the lithium tantalate modulator 34. Modulator 33 was driven continuous wave at a frequency $2\omega+\sigma$ equal to 1410 megahertz with a modulation index $M_1$ approximately equal to 0.8. Modulator 34 was driven by the EPSCO oscillator at a frequency $\omega$ equal to 700 megahertz and at a power level giving a modulation index $M_2$ approximately equal to 2. With these values the offset frequency $\sigma$ is equal to 10 megahertz. The FM-FM spectra were measured by an EMI Model 9558 photomultiplier tube biased between 600 and 1000 volts gated to be energized during the rf pulse to modulator 34. The photomultiplier tube in this configuration is sensitive at least to incident optical power of 16 nanowatts. Under these bias conditions the photomultiplier tube has a bandwidth of approximately 20 megahertz. The FM-FM spectra can also be measured using an ungated EG+G Model FND 100 photodiode having a bandwidth of approximately 1 gigahertz. It is to be noted that even a bandwidth of 1 gigahertz is significantly less than the 10 to 20 gigahertz typical of atmospheric pressure-broadened gases in the visible spectrum.

In an experimental continuous-wave FM-AM test configuration, photodetector 28 was provided by a Hewlett-Packard Model 4220PIN photodiode having a bandwidth somewhat in excess of 1 gigahertz. Oscillator 36 was provided by the Hewlett-Packard Model 8620 sweep oscillator driven at a frequency of 1060 megahertz. Oscillator 39 was provided by a General Radio Model 1209B oscillator and Boonton Model 230A amplifier 38, driven at 500 megahertz. In this configuration the offset frequency $\sigma$ is equal to 60 megahertz. To improve the signal-to-noise ratio the laser beam from source 25 was chopped at 100 hertz, and the output of mixer 46 was detected with a lock-in amplifier referenced to the chopping frequency. The XY recorder 53 was driven by the lock-in output.

The detailed shape of the spectral feature can be observed in the present invention by sweeping the probe sideband group through the feature. For good resolution both the characteristic linewidth of the beam from source 25 and the offset frequency should be significantly less than the characteristic width of the spectral feature. The probe sideband group can be made to sweep through the spectral feature by sweeping the linecenter of the beam from source 25. For this purpose source 25 can be provided by a tunable laser. Suitable tunable lasers include semiconductor diode lasers such as the Model SP5600 diode laser available from Laser Analytics of Bedford, Mass., a division of Spectra-Physics Corporation, for use in the infrared domain, F-center lasers such as the Model FCL 130 available from Burleigh Instruments, Inc. of Fishers, N.Y., and the well known dye lasers for use in the visible domain. This method of causing the probe group to sweep is desirable because of the ready commercial availability of such tunable lasers. However, diode and dye lasers, for example, can only be swept over limited ranges in the infrared and visible domains. As an alternative, the probe sideband group can be swept through the spectral feature by using a beam source 25 of fixed frequency and instead synchronously sweeping the two modulation frequencies.

FIG. 3 shows an alternative embodiment of the control electronics for synchronously sweeping the two modulation frequencies. Sweep oscillator 56 generates the frequency $\omega$ approximately equal to the displacement of the probe sideband group from the linecenter of the beam. Sweep oscillator 56 is coupled to modulator 34 through directional coupler 57 and rf amplifier 58. The frequency $\omega$ from sweep oscillator 56 is also coupled to frequency doubler 59 through the directional coupler 57. The doubled frequency output $2\omega$ from frequency doubler 59 is applied to one input of mixer 60. RF oscillator 61 generates a signal at the offset frequency $\sigma$, which is applied to a second input of mixer 60. The output signal from mixer 60 includes components at frequencies $2\omega \pm \sigma$. The output signal is applied to YIG filter 62, which selects one of the components, for example, the component at frequency $2\omega + \sigma$. That component is coupled to modulator 33 through RF amplifier 63. The output signal at offset frequency $\sigma$ from oscillator 61 also serves as the reference signal applied to the local oscillator input of mixer 64. The mixer 64 operates in the same manner as mixer 46 of FIG. 2. Mixer 64 receives at a second input 65 the output signal representative of the beam received by photodetector 28 and derives therefrom the Fourier component at the frequency $\sigma$ of the reference signal. As before, the output signal from mixer 64 is applied to appropriate signal-averaging and/or recording means.

In operation, as the frequency $\omega$ from oscillator 56 is varied, both the upper and lower sideband groups will also vary in such a manner that the spacing $\sigma$ of the component sidebands of each of the groups will remain fixed. In this manner the signal representative of the spectral feature will be a fixed Fourier component of the photodetector output signal as the probe group is continuously swept through the feature.

For ease of exposition and conceptualization the invention has been depicted in terms of probing the sample with probe and reference sideband groups formed by subjecting the beam to a double modulation prior to exposing the sample to the beam. This characterization is not essential to the operation of the invention. It has been found, for example, that in the FM-AM embodiment the sample can be exposed initially to a singly modulated beam, which then undergoes the second, amplitude modulation after interaction with the sample. In this configuration the groups of closely spaced sidebands are not generated until after the beam has interacted with the sample. Nevertheless, the sideband groups, once formed, reveal the nature of the spectral feature and are described herein as "probing" the feature whether the groups are formed before or after interaction with the sample.

Although in certain arrangements a modulation according to the invention may be imposed after interaction with the sample, a higher signal-to-noise ratio is generally found to result when both modulations are imposed on the beam prior to interaction with the sample. For this reason the latter arrangement is preferred.

The double modulation technique of the present invention can be used to provide a practical spectrometer employing only a single beam of incoherent light. In this embodiment of the invention the beam source 25 is provided by an incoherent monochromatic source such as illustrated in FIG. 4. The output of incoherent source 67 is collimated and passed through means 68 for narrowing its spectral range. Incoherent source 67 may be provided, for example, by a conventional xenon continuum lamp. The light output of the lamp is collimated and directed to the means 68 by conventional optical elements represented schematically in FIG. 4 by lens 69. The frequency-narrowing means 68 can be provided, for example, by a conventional monochromator or by a Fabry-Perot etalon. Such frequency-narrowing techniques are well known to those skilled in the art and are not described here. The light output from the means 68 is then subjected to the double modulation and applied to the sample under investigation as described above. The use of the double modulation technique eliminates the need for a second, reference beam as a comparison as found in conventional spectrometers. Furthermore, because of the greater gain available due to the comparatively narrow photodetector bandwidth, a high-power laser source is not needed and a lower-power incoherent source can be used instead. In this regard a photomultiplier tube is preferred in the incoherent spectrometer because it is more sensitive to lower light levels than photodiode detectors, which require substantially more incident power. An incoherent source is also advantageous in that it can conveniently cover a broad spectral region from near infrared to near ultraviolet in a single instrument, whereas a typical dye or diode laser source cannot be readily tuned over this range. Thus, the single-beam incoherent spectrometer employing the double modulation technique of the present invention provides an economical instrument with a high degree of versatility and sensitivity without the sacrifice of signal-to-noise ratio.

In the exposition and examples of the double modulation technique above, the modulation frequencies were taken to be $2\omega + \sigma$ and $\omega$. These frequencies are offered only by way of illustration of the invention, and no limitation to these specific frequencies is intended. It will now be appreciated by those skilled in the art that successful operation of the double modulation technique merely calls for two sideband groups, each group containing at least two component sidebands offset from one another by the frequency or frequencies to be detected in the photodetector output signal. One sideband group is used to probe the spectral feature under investigation and accordingly must be disposed in frequency at the spectral feature, or at least must be swept through the spectral feature. The other sideband group is disposed in frequency outside the range of the spectral feature so as to provide a background reference for comparison with the probe group. These sideband groups can be generated in a variety of ways by judicious choice of the modulation frequencies and modulation indices, even including choices for which the simplifying approximations made in the theoretical discussion above do not apply. All such choices of modulation frequencies and indices are considered to fall within the scope of the invention.

While the above provides a full and complete disclosure of illustrative and preferred embodiments of the present invention, various modifications, alternate constructions, and equivalents may be employed without departing from the true spirit and scope of the invention. For example, the system optics can be configured in numerous ways to meet the needs of particular types of samples and particular observing conditions. The modulations may be imposed by two distinct modulators or in some situations by a single modulator driven at two distinct frequencies. The system electronics can be configured with a variety of programmable frequency synthesis means, instead of the frequency doublers of FIGS. 2 and 3, to provide greater versatility in the selection of modulation frequencies and consequent fine structure of the probe and reference sideband groups.

Thus, the above description and illustrations should not be construed as limiting the scope of the invention, which is defined by the appended claims.

What is claimed is:

1. Apparatus for detecting a spectral feature of a sample, said feature having a characteristic width, comprising:
    a source of a generally monochromatic beam of light having a characteristic linewidth at most comparable with the width of said spectral feature;
    modulation means for modulating said beam at first and second modulation frequencies related to one another so as to provide a plurality of sidebands including a first, probe group and a second, reference group of component sidebands offset from one another within each group by a characteristic offset frequency at most comparable with the width of said feature, said probe and reference groups being disposed in frequency at said spectral feature and remote from said spectral feature, respectively;
    a photodetector disposed to receive said beam after interaction with said sample, said photodetector providing an output signal representative of the received beam; and
    detection means connected to receive said output signal and detect therein a component signal at said characteristic offset frequency representative of said spectral feature.

2. The apparatus of claim 1 wherein said photodetector has a predetermined bandwidth less than each of said first and second modulation frequencies, and said modulation frequencies are so related to one another that said offset frequency is less than said photodetector bandwidth.

3. The apparatus of claim 2 wherein said generally monochromatic beam has a characteristic linecenter, said first modulation frequency has a magnitude $2\omega + \sigma$, and said second modulation frequency has a magnitude $\omega$, where $\omega$ is approximately the frequency difference between said beam linecenter and said spectral feature and $\sigma$ is less than said photodetector bandwidth and at most comparable with the width of said spectral feature, whereby $\sigma$ equals said offset frequency.

4. The apparatus of claim 1 wherein said modulation means comprises first and second frequency modulators for frequency-modulating the beam at said first and second modulation frequencies respectively.

5. The apparatus of claim 4, further including means for driving said first frequency modulator at a power level corresponding to a modulation index not exceeding unity and for driving said second frequency modulator at a power level corresponding to a modulation index greater than unity.

6. The apparatus of claim 4 wherein said generally monochromatic beam has a characteristic linecenter, said first modulation frequency has a magnitude $2\omega + \sigma$, and said second modulation frequency has a magnitude $\omega$, where $\omega$ is approximately the frequency difference between said beam linecenter and said spectral feature and $\sigma$ is less than said photodetector bandwidth and at most comparable with the width of said spectral feature, whereby $\sigma$ equals said offset frequency.

7. The apparatus of claim 1 wherein said modulation means comprises a frequency modulator for frequency modulating the beam at said first modulation frequency and an amplitude modulator for amplitude modulating the beam at said second modulation frequency.

8. The apparatus of claim 7, further including means for driving said frequency modulator and said amplitude modulator at power levels corresponding to modulation indices not exceeding unity.

9. The apparatus of claim 7 wherein said generally monochromatic beam has a characteristic linecenter, said first modulation frequency has a magnitude $2\omega + \sigma$, and said second modulation frequency has a magnitude $\omega$, where $\omega$ is approximately the frequency difference between said beam linecenter and said spectral feature and $\sigma$ is less than said photodetector bandwidth and at most comparable with the width of said spectral feature, whereby $\sigma$ equals said offset frequency.

10. The apparatus of claim 1, further comprising sweep means for selectively varying the frequency at which said probe sideband group is disposed whereby said probe sideband group is caused to sweep through said spectral feature.

11. The apparatus of claim 10 wherein said generally monochromatic beam has a characteristic linecenter, and said sweep means selectively varies the frequency thereof.

12. The apparatus of claim 10 wherein said sweep means selectively varies said first and second modulation frequencies in relation to one another so as to cause said probe sideband group to sweep through said spectral feature.

13. Apparatus for detecting a spectral feature of a sample, said feature having a characteristic width, comprising:
    a source of a generally monochromatic beam of light having a characteristic linecenter and a characteristic linewidth at most comparable with the width of said spectral feature;

first and second frequency modulators for frequency-modulating said beam at first and second modulation frequencies related to one another so as to provide a plurality of sidebands including a first, probe group and a second, reference group of component sidebands offset from one another within each group by a characteristic offset frequency at most comparable with the width of said feature, said probe and reference groups being disposed in frequency above and below said linecenter at said spectral feature and remote from said spectral feature, respectively;

means for exposing said sample to the modulated beam;

a photodetector disposed so as to receive said beam after interaction with said sample, said photodetector providing an output signal representative of the received beam; and detection means connected to receive said output signal and detect therein a component signal at said offset frequency representative of said spectral feature.

14. The apparatus of claim 13 wherein said monochromatic beam source comprises an incoherent beam source.

15. The apparatus of claim 14 wherein said photodetector is provided by a photomultiplier tube.

16. The apparatus of claim 13 wherein said monochromatic beam source comprises a tunable laser.

17. The apparatus of claim 16 wherein said laser is tunable in the infrared portion of the spectrum.

18. The apparatus of claim 13, further comprising means for pulsed operation of said modulated beam.

19. The apparatus of claim 18 wherein said photodetector is provided by a photomultiplier tube, which in cooperation with said pulsed operation can be exposed to higher light levels than in continuous operation.

20. The apparatus of claim 13, further comprising first and second oscillators coupled to said first and second modulators for generating said first and second modulation frequencies.

21. The apparatus of claim 20, further comprising means coupled to said first and second oscillators for providing a reference signal having a frequency equal to said offset frequency for comparison with said photodetector output signal.

22. The apparatus of claim 13, further comprising:

a first oscillator for generating a first oscillation frequency equal to said offset frequency;

a second oscillator for generating a second oscillation frequency; and means coupled to said first and second oscillators for deriving said first and second modulation frequencies from said first and second oscillation frequencies.

23. The apparatus of claim 22, further comprising means coupled to said first oscillator and to said photodetector for comparing said photodetector output signal with said offset frequency.

24. The apparatus of claim 22 wherein said second oscillator is provided by a sweep oscillator for synchronously sweeping said first and second modulation frequencies.

25. Apparatus for detecting a spectral feature of a sample, said feature having a characteristic width, comprising:

a source of a generally monochromatic beam of light having a characteristic linecenter and a characteristic linewidth at most comparable with the width of said spectral feature;

a first frequency modulator for frequency-modulating said beam at a first modulation frequency;

an amplitude modulator for amplitude-modulating said beam at a second modulation frequency related to said first modulation frequency so as to provide a plurality of sidebands including a first, probe group and a second, reference group of component sidebands offset from one another within each group by a characteristic offset frequency at most comparable with the width of said feature, said probe and reference groups being disposed in frequency above and below said linecenter at said spectral feature and remote from said spectral feature, respectively;

means for exposing said sample to the modulated beam;

a photodetector disposed so as to receive said beam after interaction with said sample, said photodetector providing an output signal representative of the received beam; and detection means connected to receive said output signal and detect therein a component signal at said offset frequency representative of said spectral feature.

26. The apparatus of claim 25 wherein said amplitude modulator comprises:

a second frequency modulator for modulating said beam at said second modulation frequency; and first and second polarizers oriented with the polarization axes thereof perpendicular to one another, said polarizers being disposed in the path of said beam before and after said second frequency modulator.

27. The apparatus of claim 26 wherein said second frequency modulator comprises an electro-optic crystal having a natural birefringence, and said apparatus further comprises means for applying an electrical potential across said crystal for counteracting said birefringence.

28. The apparatus of claim 26, further comprising a pulsed cavity oscillator coupled to said second frequency modulator for effecting pulsed operation of said modulated beam.

29. The apparatus of claim 28 wherein said photodetector is provided by a photomultiplier tube, which in cooperation with said pulsed operation can be exposed to higher light levels than in continuous-wave operation.

30. The apparatus of claim 25 wherein said monochromatic beam source comprises an incoherent beam source.

31. The apparatus of claim 30 wherein said photodetector is provided by a photomultiplier tube.

32. The apparatus of claim 25 wherein said monochromatic beam source comprises a tunable laser.

33. The apparatus of claim 32 wherein said laser is tunable in the infrared portion of the spectrum.

34. The apparatus of claim 25, further comprising first and second oscillators coupled to said first frequency modulator and to said amplitude modulator for generating said first and second modulation frequencies.

35. The apparatus of claim 34, further comprising means coupled to said first and second oscillators for providing a reference signal having a frequency equal to said offset frequency for comparison with said photodetector output signal.

36. The apparatus of claim 25, further comprising:

a first oscillator for generating a first oscillation frequency equal to said offset frequency;

a second oscillator for generating a second oscillation frequency; and means coupled to said first and second oscillators for deriving said first and second modulation frequencies from said first and second oscillation frequencies.

37. The apparatus of claim 36, further comprising means coupled to said first oscillator and to said photodetector for comparing said photodetector output signal with said offset frequency.

38. The apparatus of claim 36 wherein said second oscillator is provided by a sweep oscillator for synchronously sweeping said first and second modulation frequencies.

39. Apparatus for detecting a spectral feature of sample, said feature having a characteristic width, comprising:

a source of a generally monochromatic beam of light having a characteristic linewidth at most comparable with the width of said spectral feature and having a characteristic linecenter removed from said spectral feature by a frequency displacement greater than said characteristic spectral feature width, said beam being disposed so as to expose said sample thereto;

a first oscillator for generating a first modulation frequency ($\omega$) approximately equal to said frequency displacement;

a second oscillator for generating a second modulation frequency ($2\omega \pm \sigma$) differing from twice said first modulation frequency by an offset frequency ($\sigma$) small in comparison with said characteristic spectral feature width;

means coupled to said first and second oscillators for modulating said beam at said first and second modulation frequencies;

a photodetector disposed so as to receive said beam after interaction with said sample, said photodetector providing an output signal representative of the received beam;

means receiving said first and second modulation frequencies and deriving therefrom a reference signal having a frequency equal to said offset frequency; and means receiving said reference signal and said photodetector output signal and deriving therefrom the component of said photodetector output signal at said offset frequency representative of said spectral feature.

40. The apparatus of claim 39 wherein said means for modulating said beam comprises first and second frequency modulators, whereby said beam is frequency-modulated at said first and second modulation frequencies.

41. The apparatus of claim 40 wherein said means deriving said reference signal comprises:

a frequency doubler receiving said first modulation frequency ($\omega$) and providing a signal of frequency ($2\omega$) equal to twice said first modulation frequency; and a mixer receiving said second modulation frequency ($2\omega \pm \sigma$) and said frequency ($2\omega$) from said frequency doubler and providing said reference signal at said offset frequency ($\sigma$).

42. The apparatus of claim 41, further comprising signal averaging means receiving said component of said photodetector output signal at said offset frequency and providing an average value thereof.

43. The apparatus of claim 42 wherein said monochromatic beam source comprises a tunable laser.

44. The apparatus of claim 39 wherein said means for modulating said beam comprises a frequency modulator and an amplitude modulator, whereby said beam is frequency-modulated at one of said first and second modulation frequencies and is amplitude-modulated at the other of said modulation frequencies.

45. The apparatus of claim 44 wherein said means deriving said reference signal comprises:

a frequency doubler receiving said first modulation frequency ($\omega$) and providing a signal of frequency ($2\omega$) equal to twice said first modulation frequency; and a mixer receiving said second modulation frequency ($2\omega \pm \sigma$) and said frequency ($2\omega$) from said frequency doubler and providing said reference signal at said offset frequency ($\sigma$).

46. The apparatus of claim 45, further comprising signal averaging means receiving said component of said photodetector output signal at said offset frequency and providing an average value thereof.

47. The apparatus of claim 46 wherein said monochromatic beam source comprises a tunable laser.

48. Apparatus for detecting a spectral feature of sample, said feature having a characteristic width, comprising:

a source of a generally monochromatic beam of light having a characteristic linewidth at most comparable with the width of said spectral feature and having a characteristic linecenter removed from said spectral feature by a frequency displacement greater than said characteristic spectral feature width, said beam being disposed so as to expose said sample thereto;

a first oscillator for generating a first modulation frequency ($\omega$) approximately equal to said frequency displacement;

a second oscillator for generating an offset frequency ($\sigma$) small in comparison with said characteristic spectral feature width;

frequency synthesis means receiving said first modulation frequency ($\omega$) and said offset frequency ($\sigma$) and deriving therefrom a second modulation frequency ($2\omega \pm \sigma$) differing from twice said first modulation frequency by said offset frequency ($\sigma$);

means coupled to said first oscillator and to said frequency synthesis means for modulating said beam at said first and second modulation frequencies;

a photodetector disposed so as to receive said beam after interaction with said sample, said photodetector providing an output signal representative of the received beam; and means receiving said offset frequency and said photodetector output signal and deriving therefrom the component of said photodetector output signal at said offset frequency representative of said spectral feature.

49. The apparatus of claim 48 wherein said first oscillator is provided by a sweep oscillator for synchronously sweeping said first and second modulation frequencies.

50. The apparatus of claim 49 wherein said means for modulating said beam comprises first and second frequency modulators, whereby said beam is frequency-modulated at said first and second modulation frequencies.

51. The apparatus of claim 49 wherein said means for modulating said beam comprises a frequency modulator and an amplitude modulator, whereby said beam is frequency-modulated at one of said first and second modulation frequencies and is amplitude-modulated at the other of said modulation frequencies.

52. An incoherent, single-beam spectrometer for use in detecting a spectral feature of a sample, said feature having a characteristic width, comprising:
  an incoherent source of a single beam of generally monochromatic light having a characteristic linewidth at most comparable with the width of said spectral feature;
  modulation means for modulating said beam at first and second modulation frequencies related to one another so as to provide a plurality of sidebands including a first, probe group and a second, reference group of component sidebands offset from one another within each group by a characteristic offset frequency at most comparable with the width of said feature, said probe and reference groups being disposed in frequency at said spectral feature and remote from said spectral feature, respectively;
  means for exposing said sample to the modulated beam;
  a photodetector disposed so as to receive said beam after interaction with said sample, said photodetector having a predetermined bandwidth less than each of said first and second modulation frequencies and greater than said offset frequency and providing an output signal representative of the received beam; and
  detection means connected to receive said output signal and detect therein a component signal at said offset frequency representative of said spectral feature.

53. The spectrometer of claim 52 wherein said means for exposing said sample to the beam comprises an absorption cell disposed such that the beam received by said photodetector represents absorption by said sample.

54. The spectrometer of claim 53 wherein said photodetector is responsive to an incident optical power of at least 16 nanowatts.

55. The spectrometer of claim 54 wherein said photodetector is provided by a photomultiplier tube.

56. The spectrometer of claim 54 wherein said incoherent beam source comprises an incoherent light source and means for narrowing the spectral range thereof.

57. The spectrometer of claim 56, further comprising sweep means for selectively varying the frequency at which said probe sideband group is disposed whereby said probe sideband group is caused to sweep through said spectral feature.

58. The spectrometer of claim 57 wherein said generally monochromatic beam has a characteristic linecenter, and said sweep means selectively varies the frequency thereof.

59. The spectrometer of claim 56 wherein said modulation means comprises first and second frequency modulators for frequency-modulating the beam at said first and second modulation frequencies.

60. The spectrometer of claim 56 wherein said modulation means comprises a frequency modulator for frequency-modulating the beam at the first modulation frequency, and an amplitude modulator for amplitude-modulating the beam at the second modulation frequency.

61. A method of detecting a spectral feature of a sample, said spectral feature having a characteristic width, comprising the steps of:
  providing a generally monochromatic beam of light having a characteristic linewidth at most comparable with the width of said spectral feature;
  modulating said beam at first and second modulation frequencies related to one another so as to provide a plurality of sidebands including a first, probe group and a second, reference group of component sidebands offset from one another within each group by a characteristic offset frequency at most comparable with the width of said feature, said probe and reference groups being disposed in frequency at said spectral feature and remote from said spectral feature, respectively;
  directing said beam at said sample so as to interact therewith;
  photodetecting said beam after it has interacted with said sample to detect therein a signal at said characteristic offset frequency representative of said spectral feature.

62. A method of measuring the absorption spectrum of a sample having a spectral feature of characteristic width comprising the steps of:
  providing a generally monochromatic beam of incoherent light having a characteristic linewidth at most comparable with the width of said spectral feature;
  modulating said beam at first and second modulation frequencies related to one another so as to provide a plurality of sidebands including a first, probe group and a second, reference group of component sidebands offset from one another within each group by a characteristic offset frequency at most comparable with the width of said feature, said probe and reference groups being disposed in frequency at said spectral feature and remote from said spectral feature, respectively;
  directing said beam at said sample so as to interact therewith;
  photodetecting in the beam transmitted by said sample only the spectral component frequencies thereof below a predetermined cutoff frequency less than each of said first and second modulation frequencies; and
  detecting within the photodetected spectral component frequencies below said cutoff a component at said offset frequency representative of the absorption by said spectral feature.

63. The method of claim 62 wherein the characteristic linewidth of said beam and said characteristic offset frequency are substantially less than the width of said spectral feature, further comprising the step of causing said probe group to sweep through said spectral feature.

* * * * *